United States Patent [19]
Henderson et al.

[11] Patent Number: 5,937,104
[45] Date of Patent: Aug. 10, 1999

[54] COMBINING A FIRST DIGITAL IMAGE AND A SECOND BACKGROUND DIGITAL IMAGE USING A KEY COLOR CONTROL SIGNAL AND A SPATIAL CONTROL SIGNAL

[75] Inventors: Todd R. Henderson, Conesus; Kevin E. Spaulding, Spencerport; Douglas W. Couwenhoven, Fairport, all of N.Y.

[73] Assignee: Eastman Kodak Company, Rochester, N.Y.

[21] Appl. No.: 08/934,178

[22] Filed: Sep. 19, 1997

[51] Int. Cl.$^6$ ................................................. G06K 15/316
[52] U.S. Cl. ........................... 382/279; 382/164; 382/282; 382/283; 348/586; 348/587
[58] Field of Search ..................... 382/167, 163, 382/164, 278–284, 173; 348/586–587, 591–592, 598, 578, 599; 345/431, 430, 432–434, 150, 199; 358/450–452, 540

[56] References Cited

U.S. PATENT DOCUMENTS

| | | | |
|---|---|---|---|
| 4,873,568 | 10/1989 | Jackson et al. | 348/578 |
| 5,301,016 | 4/1994 | Gehrmann | 348/586 |
| 5,381,184 | 1/1995 | Gehrmann | 348/586 |
| 5,382,980 | 1/1995 | Gehrmann | 348/587 |
| 5,444,496 | 8/1995 | Gehrmann | 348/587 |
| 5,455,633 | 10/1995 | Gehrmann | 348/587 |
| 5,500,684 | 3/1996 | Uya | 348/592 |
| 5,708,479 | 1/1998 | Gehrmann | 348/587 |
| 5,742,354 | 4/1998 | Vlahos et al. | 348/586 |
| 5,812,214 | 9/1998 | Miller | 348/587 |

*Primary Examiner*—Leo H. Boudreau
*Assistant Examiner*—Ishrat Sherali
*Attorney, Agent, or Firm*—Raymond L. Owens

[57] ABSTRACT

A method for combining a first digital image and a second background digital image, both images including pixels having color values, wherein the first digital image includes both a foreground region having foreground color values and a key color region characterized by a key color, as well as a mixed region where the pixel color values are a mixture of the foreground color value and the key color, includes determining a first control signal that indicates the relative proportions of the foreground color value and the key color for pixels in the first digital image; and segmenting the first digital image into a key color region and a non-key color region in which the non-key color region includes pixels in the first digital image that are not in the key color region. The method also includes determining a second control signal that indicates a spatial distance between the pixels in the first digital image and a boundary between the key color region and the non-key color region; and combining the first digital image and the second background digital image in response to the first and second control signals, the key color, and an illuminant color value.

15 Claims, 5 Drawing Sheets

COMBINING A FIRST DIGITAL IMAGE AND A SECOND BACKGROUND DIGITAL IMAGE USING A KEY COLOR CONTROL SIGNAL AND A SPATIAL CONTROL SIGNAL

CROSS REFERENCE TO RELATED APPLICATIONS

The present invention is related to commonly assigned U.S. patent application Ser. No. 08/934,373 filed Sep. 19, 1997, entitled "Method For Segmenting a Digital Image Into a Foreground Region and a Key Color Region" to Todd R. Henderson et al., and commonly assigned U.S. patent application Ser. No. 08/934,372 filed Sep. 19, 1997, entitled "Method For Computing a Control Signal For Combining Digital Images" to Todd R. Henderson et al., assigned to the assignee of the present invention. The disclosure of these related applications is incorporated herein by reference.

FIELD OF THE INVENTION

This invention pertains to the field of digital imaging, and more particularly to a method used for combining a first digital image and a second background digital image.

BACKGROUND OF THE INVENTION

Many different types of so-called "special-effects" can be created using digital imaging techniques. One such class of special-effects techniques involves inserting the foreground of one image into a different background image. This makes it possible for a person or object to appear to be in a different setting than they really are. For example, the weatherman can appear to be standing in front of a weather map, when in reality he is standing in front of a blue wall, or an actor can appear to be standing on the edge of a cliff, when in reality he is actually performing in the safety of a studio. Typically, these methods rely on having the foreground object photographed in front of a brightly colored backdrop of a known color. A common backdrop color is blue, which is why this technique is often referred to as "blue-screening."

The basic steps involved with implementing a typical blue-screening algorithm are illustrated in FIG. 1. First, an object is photographed in front of a brightly colored backdrop of a known color which is shown as an image capture step 10. The captured image will contain a foreground region corresponding to the object being photographed, and a key color region, corresponding to the brightly colored backdrop. The key color region has a key color such as bright green or bright blue.

A segmentation step 12 is next used to segment the captured image into the foreground region and the key color region by detecting portions of the image that have the key color. Since the color of the backdrop will not be perfectly constant, the key color will typically be characterized by a range of color values surrounding some nominal color value, rather than a single point in color space.

Many blue-screening algorithms also include a control signal creation step 14. This is useful because the image will typically contain some foreground pixels that have been contaminated by the key color. For example, the pixels that occur along the boundary between the foreground region and the key color region usually contain a mixture of foreground color and key color. The control signal is determined to indicate the relative amount of foreground color and key color contained in each contaminated pixel.

Finally, an image composition step 16 is used to combine the foreground region of the captured image with a second background image. During this step, the foreground region of the captured image is inserted into the background image. For the foreground pixels that were determined to be contaminated with the key color, the control signal can be used to remove the appropriate amount of key color and replace it with the corresponding background image.

Several methods have been disclosed in the prior art for the image composition step 16 shown in FIG. 1. These methods generally involve the use of a control signal to regulate a fractional amount of the pixel color values that will be blended together from the first digital image and the second background digital image. Typically, these type of methods take the form of the equation:

$$R=(1-k)F+kS \qquad (1)$$

where R is the color value of the combined image, k is the control signal, S is the second background digital image, and F is the first digital image. Examples of these methods that can be found in prior art are shown in FIG. 2. See U.S. Pat. No. 5,381,184. FIG. 2(a) illustrates a threshold where the key color region 20 has a control signal value, k, equal to 1. The control signal is equal to 0 outside of the key color region 20. FIG. 2(b) illustrates a large key color region 22 where the control signal value k=1. Once again, all color values outside of the key color region 22 have a control signal value equal to 0. FIG. 2(c) illustrates a small key color region 24 where the control signal value k=1 and the area outside of the key color region has a control signal value k=0. FIG. 2(a)–2(c) all exhibit a binary control signal. These approaches will produce inferior composite images in that either there will be significant fringe effects around the foreground region in the composite image or that the foreground region will have been replaced with the new background around the periphery of what should have been the foreground region.

An improvement relative to the binary control signal methods can be obtained by making the control signal transitional such that the control signal varies from a first value, for example 0, to a second value, 1. This approach has become known as "soft chroma keying" and has enabled the blending of the first digital image with the second background digital image to have a smooth transition from the foreground region to the new background region. FIG. 2(d) illustrates a transitional control signal for a soft chroma keying method. The small dark shaded circle represents the key color region 28 and the large lightly shaded region represents the mixed region 26. The control signal value k ranges from 1 in the key color region 28 to 0 at the outer edge of the circle representing the mixed region 26. The control signal value falls smoothly from 1 to 0 when traversing from the outer edge of the key color region 28 to the outer edge of the mixed region 26. The soft chroma keying approach was an improvement to the previously described methods, however, there were still several problems with this method. An example of one problem with soft chroma keying involves how large the mixed region should be. If the mixed region extends too far out from the key color region then the background image will replace too much of the foreground region of the first image. On the other hand, if the mixed region doesn't extend far enough, then fringe effects will occur on the outer edge of the foreground region in the combined image where the foreground region is contaminated by the key color.

A further improvement to the above methods involved the use of a different image composition equation. Traditionally, Eq. (1) was used to combine the two images. However, when using this approach fringe effects could still be observed where the edges of the foreground region of the combined image were contaminated by the key color. This can be improved by the removal of some fraction of the key color from pixels contained in the mixed region. The amount of key color removed was based upon the control signal as shown in the following equation:

$$R=F+kS-kC \qquad (2)$$

where k is the control signal, F is the color value of a pixel in the first digital image, S is the color value for a corresponding pixel in the background digital image, C is the key color, and R is the resulting color value of the combined image. It can be seen that the effect of applying this equation to the contaminated pixels is to subtract a portion of the key color from the first digital image, and replace it with an equivalent portion of the second background digital image.

Despite the improvement realized using the approach given in Eq. (2), a number of deficiencies remain. In particular, all methods as described in the prior art are incapable of handling key color contamination from secondary illumination. In this context, secondary illumination is defined as the light reflecting off of the key color backdrop onto the subject causing contamination of foreground pixels with the key color. Generally, this contamination will be most obvious when portions of the subject that are away from the boundary between the foreground region (subject) and the key color region (backdrop) are effected. If the method of Eq. (2) is used to compensate for the key color contamination due to secondary illumination, incorrect results will be obtained. In this case, the key color contamination will be removed according to the control signal, and replaced with the new background. However, if the foreground pixels that are contaminated by the secondary illumination are a sufficient distance away from the boundary between the key color region and the foreground region, replacing the key color contamination with the new background can cause the foreground region to appear to be partially transparent. This has the effect of contaminating the foreground image with the background image, which can be just as objectionable as contamination by the key color.

Finally, another issue that the prior art methods have difficulty with is when the subject contains color values similar to those of the key color. In this case, the subject region will be classified as mixed pixels, and will therefore have intermediate control signal values. Therefore, a portion of the foreground image will be replaced by the background image during the image composition process. This will again have the effect of causing the foreground region to appear to be partially transparent.

SUMMARY OF THE INVENTION

It is an object of the present invention to provide a method for overcoming the above deficiencies, and to create a composite image that contains undetectable fringe effects.

It is another object of the present invention to remove key color contamination caused by secondary illumination without causing transparency effects or undesired alterations to the color value of the contaminated pixels.

It is another object of the present invention to minimize the incorrect replacement of the color values of the foreground image with the color values of the background image when the subject contains color values that are similar to those of the key color.

These objects are achieved by a method for combining a first digital image and a second background digital image, both images including pixels having color values, wherein the first digital image includes both a foreground region having foreground color values and a key color region characterized by a key color, as well as a mixed region where the pixel color values are a mixture of the foreground color value and the key color, comprising the steps of:

a) determining a first control signal that indicates the relative proportions of the foreground color value and the key color for pixels in the first digital image;

b) segmenting the first digital image into a key color region and a non-key color region in which the non-key color region includes pixels in the first digital image that are not in the key color region;

c) determining a second control signal that indicates a spatial distance between the pixels in the first digital image and a boundary between the key color region and the non-key color region; and d) combining the first digital image and the second background digital image in response to the first and second control signals, the key color, and an illuminant color value.

ADVANTAGES

The present invention has an advantage over the prior art in that it provides for creating a composite image that contains undetectable fringe effects, while minimizing the creating of other artifacts. In particular, the present invention removes key color contamination caused by secondary illumination without causing transparency effects or undesired alterations to the color value of the contaminated pixels. Additionally, it minimizes the incorrect replacement of the foreground region with the background region when the subject contains color values that are similar to those of the key color.

DETAILED DESCRIPTION OF THE INVENTION

This invention represents an improved method for combining a first digital image and a second background digital image, both images being comprised of pixels having color values, wherein the first digital image includes both a foreground region having foreground color values and a key color region characterized by a key color, as well as a mixed region where the pixel color values are a mixture of the foreground color value and the key color. This method can be applied to digital images captured by a digital still camera, a video camera, or other sources of digital images such as scanned photographs or scanned photographic negatives. The desired improvements are accomplished by implementing a spatial control signal in conjunction with a spectral control signal, which together are used for combining two digital images. The spatial control signal is used to indicate when a contaminated pixel is near the boundary between the key color region and the non-key color region, or whether it is far from the boundary. Since contaminated pixels that are far from the boundary are likely to result from causes such as secondary illumination, the spatial control signal can be used to adjust the image composition process to more optimally combine the first and second digital images. In particular, instead of replacing the key color contamination completely with the background image, a portion of the key color contamination is replaced by an illuminant color.

Figure 3:
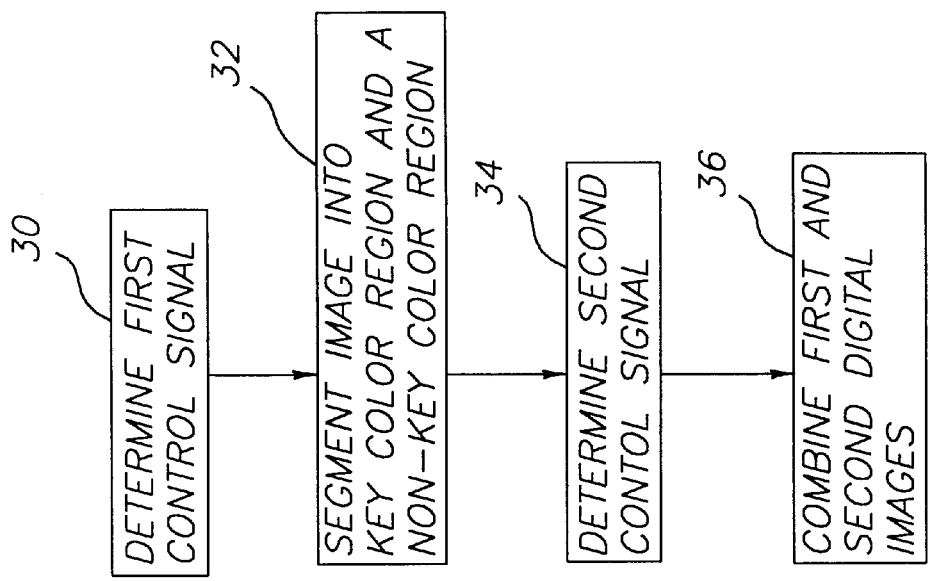
FIG. 3 is a flow diagram illustrating one preferred embodiment of the present invention.
Figure 1:
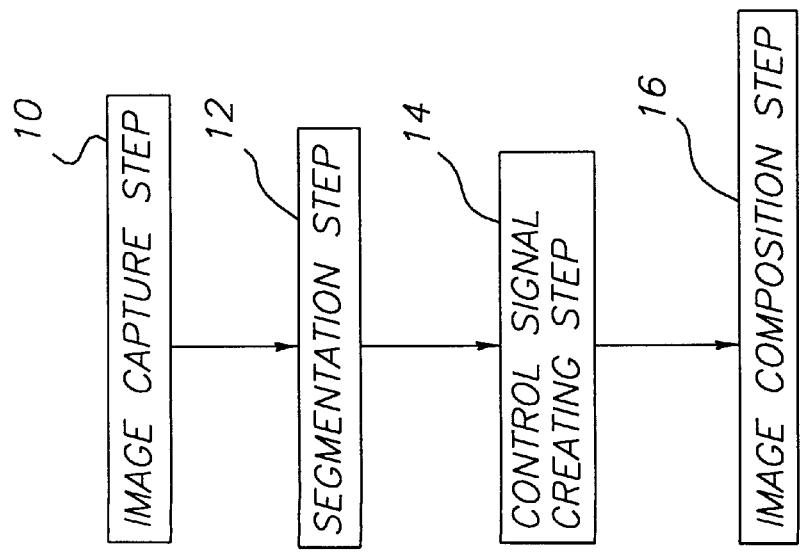
FIG. 1 is a flow diagram illustrating a prior art method for compositing two images.
Figure 2A:
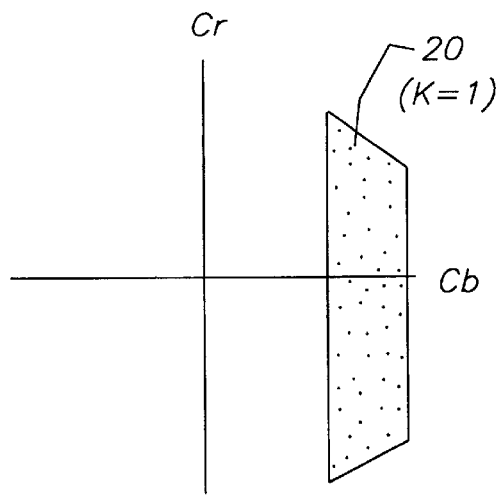
FIG. 2(a) through 2(d) illustrate a number of prior art methods for generating a control signal.
Figure 2B:
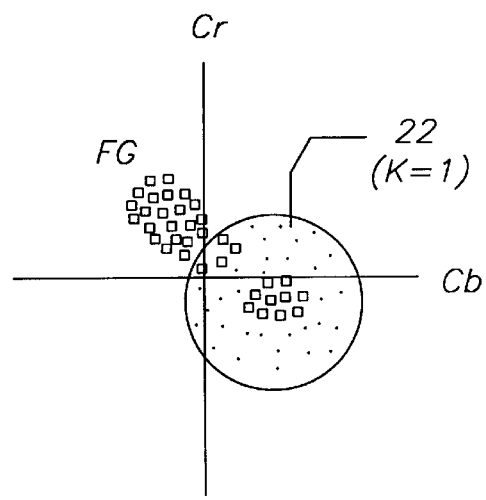
Figure 2C:
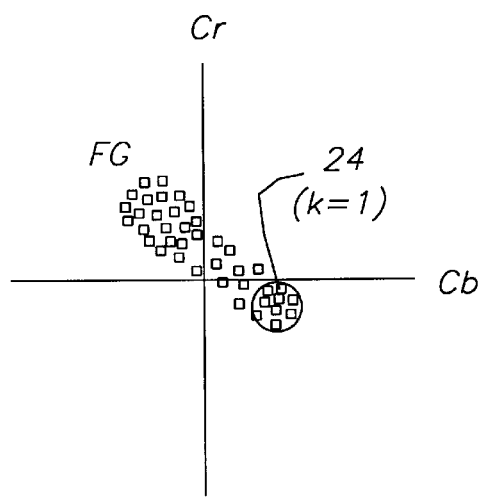
Figure 2D:
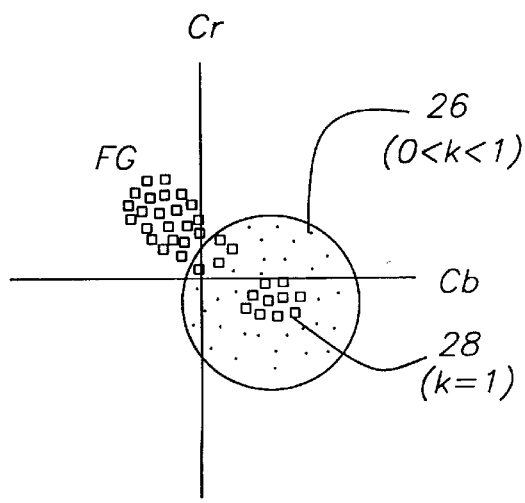

A series of steps associated with one preferred embodiment of the present invention is shown in FIG. 3. First, a first control signal generation step 30 is performed. The purpose of this step is to create a spectral control signal that indicates the relative proportions of the key color and the foreground color value contained in each pixel of the first digital image. Next a segmentation step 32 is performed on the first digital image such that the image is separated into a key color region and a non-key color region. Typically, the segmentation step makes use of the first control signal, however this is not a general requirement. As a result, the order of the first control signal generation step 30 and the segmentation step 32 may be interchangeable in many cases. Next, a second control signal generation step 34 is performed. The second control signal indicates a spatial distance between the pixels in the first digital image and the boundary between the key color and the non-key color regions identified in the segmentation step 32. Finally, the first digital image and the second background digital image are combined to form a composite image using an image combination step 36.

We will now consider each of these steps in more detail, starting with the first control signal generation step 30. This step is used to determine a first control signal which indicates the relative proportions of the foreground color value and the key color for pixels in the first digital image.

A preferred method for producing a control signal is described in above referenced U.S. application Ser. No. 08/934,372 filed concurrently herewith. In this case, the first control signal is generated by segmenting the first digital image into a foreground region and a key color, identifying transition region pixels in the first digital image that are in the vicinity of a boundary between the segmented foreground region and the segmented key color region, computing a color difference signal between the color values of the first digital image and the key color for at least some pixels in the transition region, and computing the first control signal as a function of the color difference signal. A preferred method for calculating the color difference signal includes the determination of a hue difference signal and/or a chroma difference signal. Both the hue difference signal and the chroma difference signal, may also be a function of a luminance signal. For a more detailed description of this method, see the above referenced commonly assigned cross reference to related applications.

Figure 4A:
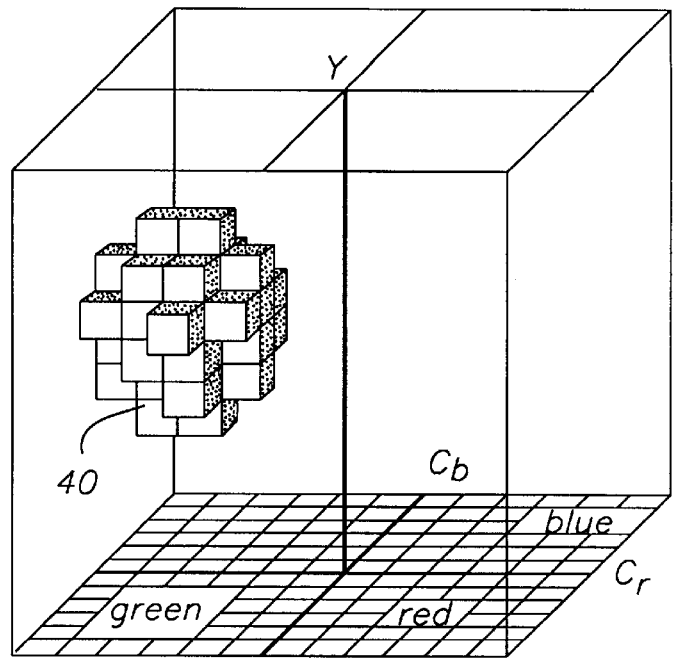
FIG. 4(a) is a diagram illustrating a key color volume characterized by a multi dimensional lookup table and FIG. 4(b) is a diagram illustrating a key color volume characterized by a range of hue angles and chroma values.
Figure 4B:
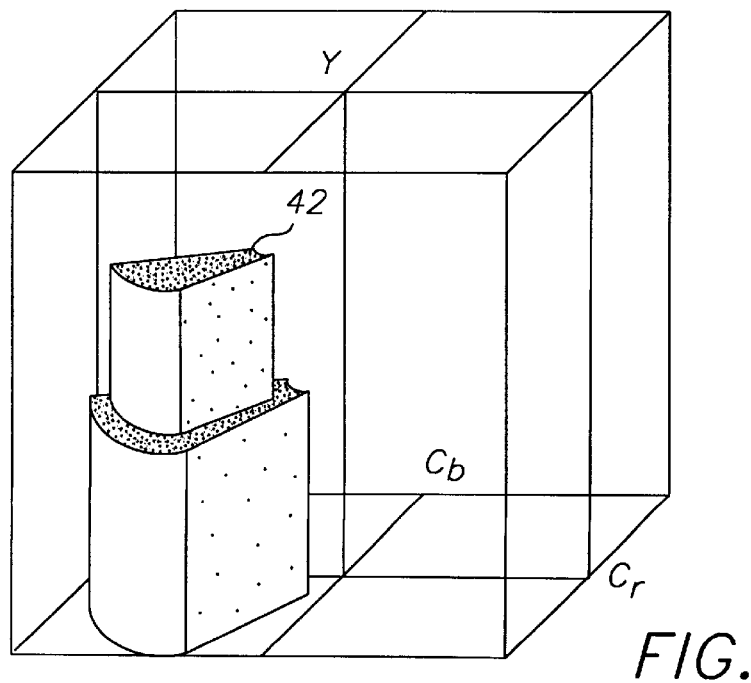

The next step in the preferred embodiment of the present invention is the segmentation step 32. This step involves the segmentation of the first digital image into a key color region and a non-key color region. The non-key color region is made up of a mixed region and a foreground region. The mixed region contains foreground pixels where the foreground color values are contaminated with the key color. Once again, there are several methods that can be used for segmenting the first digital image into a key color region and a non-key color region. A preferred method is described in the copending above referenced U.S. patent application Ser. No. 08/934,372 filed concurrently herewith. In one variation of this method, the image is segmented by characterizing a distribution of key color values, using the distribution of key color values to produce a multi-dimensional look-up-table having three or more dimensions indexed by color values in a selected color space to define a key color volume, addressing the multi-dimensional look-up table with color values of pixels in the first digital image to determine whether the color values of such pixels are within the key color volume, and labeling pixels in the first digital image whose color values fall within the key color volume to be within the key color region and labeling all other pixels to be within the non-key color region. In another variation of this method, the key color volume is characterized by a range of hue angles and a range of chroma values wherein at least one of such ranges is a function of a luminance value. The color values of pixels in the first digital image are compared against these ranges to determine whether the color values of such pixels are within the key color volume. In accordance with these variations, FIG. 4(a) illustrates a key color volume 40 characterized by a multi-dimensional look-up table in a YCrCb color space, and FIG. 4(b) illustrates a key color volume 42 defined by ranges of hue angles and chroma values in a YCrCb color space.

It can be noted that the preferred method that was previously described for performing the first control signal generation step 30 also included an image segmentation step. It should be noted that it is only necessary to perform one segmentation operation, and that the results of the segmentation step can be used for both the first control signal generation step 30 as well as the segmentation step 32 being described here. It should also be noted that the order of these steps is arbitrary, and that they can be rearranged with no impact on the final results.

After the first digital image has been segmented into the key color region and the non-key color region, the second control signal generation step 34 is performed. The second control signal is intended to be an indication of the spatial distance between the pixels in the first digital image and the boundary between the key color region and the non-key color region. Since key color contamination that occurs far away from the boundary between the key color region and the non-key color region is likely to be due to causes such as secondary illumination rather than simple blurring along the edge of the subject, it is desirable to be able to deal with this type of contamination in a different manner. As a result, the second control signal can be used to adjust the image composition process as a function the spatial distance between a given pixel value and the boundary between the key color region and the non-key color region.

Figure 5A:
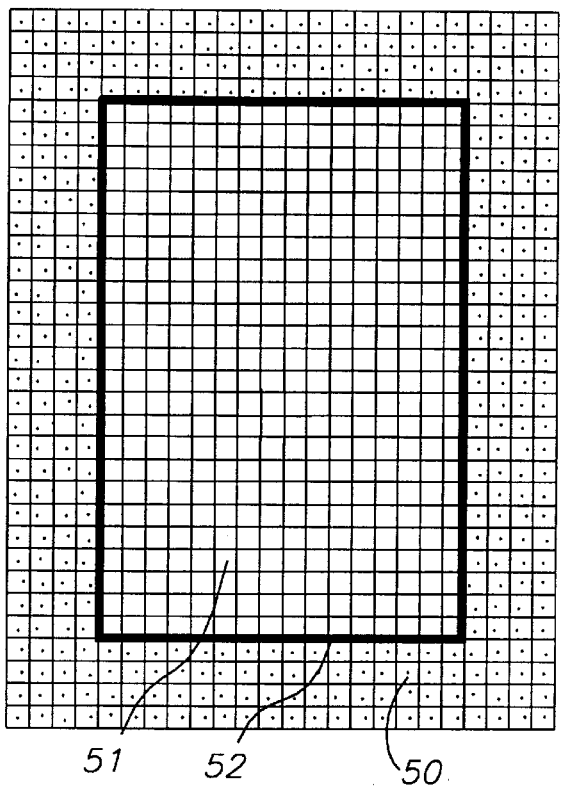
FIG. 5(a) illustrates a mask image and FIG. 5(b) illustrates a convolved mask image.

The second control signal can be calculated several ways. In a preferred embodiment of this invention the output of the segmentation step 32 is used to create a mask image which is then convolved with a convolution filter to determine a convolved mask image having convolved mask pixel values. From these convolved mask pixel values the second control signal is determined. FIG. 5(a) shows an example of a mask image where the shaded area represents the key color region 50 and the unshaded area represents the non-key color region 51. The boundary 52 between the key color region and the non-key region is shown as a heavy line. The mask image can be created by labeling pixels in key color region 50 with a first value (e.g., 1.0) and labeling pixels in the non-key color region with a second value (e.g., 0.0).

Figure 5B:
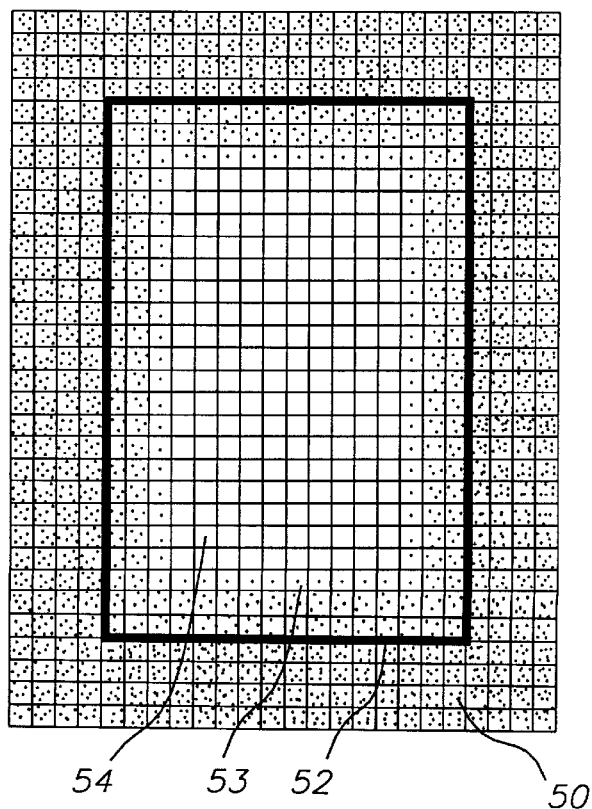

The mask image is next convolved with a convolution filter to determine a convolved mask image having convolved mask pixel values. Generally a low-pass convolution filter is used for this process, such as a "box-car" filter, where the radius of the convolution filter corresponds to the desired width of the mixed region. A typical size for the box-car filter is 21×21, although the filter size that produces optimal results will be a function of the image size, and other system parameters. For computational efficiency, the convolved mask image only needs to be calculated for pixels in the mask image that were classified as non-key color pixels. FIG. 5(b) illustrates an example of a convolved mask image where for purposes of illustration a 7×7 convolution filter has been used.

As shown in FIG. 5(a) the dark shaded area represents the key color region 50, and the heavy line represents the boundary 52 between the key color region and the non-key region. A mixed region 53 is shown by a lightly shaded area. The shading is shown to get lighter as the pixels get farther from the boundary 52 between the key color region and the non-key region. A foreground region 54 is shown as an unshaded area where the convolved mask image is unaffected by the convolution operation since the pixels are far enough away from the boundary. Since the convolution operation is only computed for the pixels in the non-key color region 51, the mask values in the key color region 50 are unchanged relative to FIG. 5(a). Since a 7×7 convolution filter was used, the mixed region is 3 pixels wide. It is assumed for this example that the convolution filter is normalized appropriately so that the convolved mask pixel values will be intermediate to the first value defined for the key color region and the second value defined for the non-key color region (e.g., between 0.0 and 1.0). However, it should be noted that it is not necessary to normalize the convolution filter in any particular manner to implement the method of the present invention. It may also be necessary to compute a convolved mask value for other steps in the process of implementing the blue-screening algorithm. For example the method for performing the control signal creation step 14 that was described in the copending above referenced U.S. patent application Ser. No. 08/934,372 filed concurrently herewith can be implemented using a convolution operation. It should be noted that it is only necessary to perform the convolution operation once in such cases, and that the resulting convolved mask image can then be used for both steps. It should also be noted that the order of these steps is arbitrary, and that they can be rearranged with no impact on the final results.

The second control signal can now be calculated as a function of the convolved mask pixel values. The second control signal is an indication of the spatial distance between the pixels in the first digital image and the boundary between the key color region and the non-key region. The convolved mask image has the characteristic that the convolved mask pixel values will change smoothly from the first value defined for the key color region to the second value defined for the non-key color region as the distance increases away from the boundary between the key color region and the non-key region. Therefore, a simple functional relationship can be used to compute the second control signal from the convolved mask pixel values. Many different types of functions could be designed for this purpose. One such method for determining the second control signal from the convolved mask pixel values is given by the following equation:

$$y = \left(\frac{G - c_1}{c_2}\right)^{\alpha_g} \quad (3)$$

where y is the second control signal, G is the convolved mask pixel value, and $c_1$, $c_2$, and $\alpha_g$ are constants. For the above example where the first value for the key color region was 1.0 and the second value for the non-key color region was 0.0, typical values for these constants would be $c_1$=0.0, $c_2$=0.5, and $\alpha_g$=0.5. The values of the $c_1$ and $c_2$ constants are simply used to normalize the values to be in the range 0.0 to 1.0, and the $\alpha_g$ is used to control how quickly the second control value changes as a function of the distance away from the boundary between the key color region and the non-key region. Normally, $\alpha_g$ will be in the range of 0.01 to 100.0.

Many other methods could also be used to determine the second control signal. For example, the distance between each pixel and the nearest point on the boundary between the key color region and the non-key color region could be computed. This distance could then be used to compute the second control signal.

In certain cases, it may be desirable to let the user assist in the process of determining the second control signal. For example, the user might be allowed to select an area of the image which is affected by secondary illumination by means of a mouse, joystick, or some other sort of pointing device. The second control signal could then be defined to have a specific value in that area. It may also be desirable to allow the user to specify that different methods be used to generate the second control signal in different portions of the image. For example, the user could indicate that one area of the image is affected by secondary illumination, whereas another area of the image contained a subject color that was close to the key color. The parameters involved in the creation of the second control signal could then be adjusted to produce the optimal results in each area.

After the second control signal has been determined, an image combination step 36 is performed in which the first digital image is combined with the second background digital image. The two digital images are combined in response to the first and second control signals, the key color value, and an illuminant color value. To be more specific, in a preferred embodiment of the present invention, the first digital image and second background digital image are combined by performing a weighted summation of the color values of the first digital image, the color values of the second digital image, the illuminant color value, and a key color value, where the weighting values are determined from the first and second control signals. In a preferred embodiment of this invention, the first digital image and the second background digital image are combined using the following equation:

$$R = F - k*C + k*y*S + k*(1-y)*I \quad (4)$$

where k is the first control signal, y is the second control signal, F is the color value of a pixel in the first digital image, S is the color value for a corresponding pixel in the second background digital image, C is the key color value, I is the illuminant color value, and R is the resulting color value of the combined image.

The illuminant that is added to the final composite image can have any desired color value. A typical illuminant color value will be that of a neutral color value (e.g., white). However, the illuminant can be a non-neutral color value and have color values containing any desired spectral characteristics. For example, the illuminant can have color values matching those of a tungsten source, a fluorescent source, a daylight source such as D50, or any other known source. In some cases, it may also be desirable to have the illuminant color value correspond to some estimate of the subject color. This could be obtained from the examination of nearby uncontaminated pixels. In some cases, it may also be desirable to adjust the intensity of the illuminant color value so that it has the same luminance level as the key color.

Figure 6:
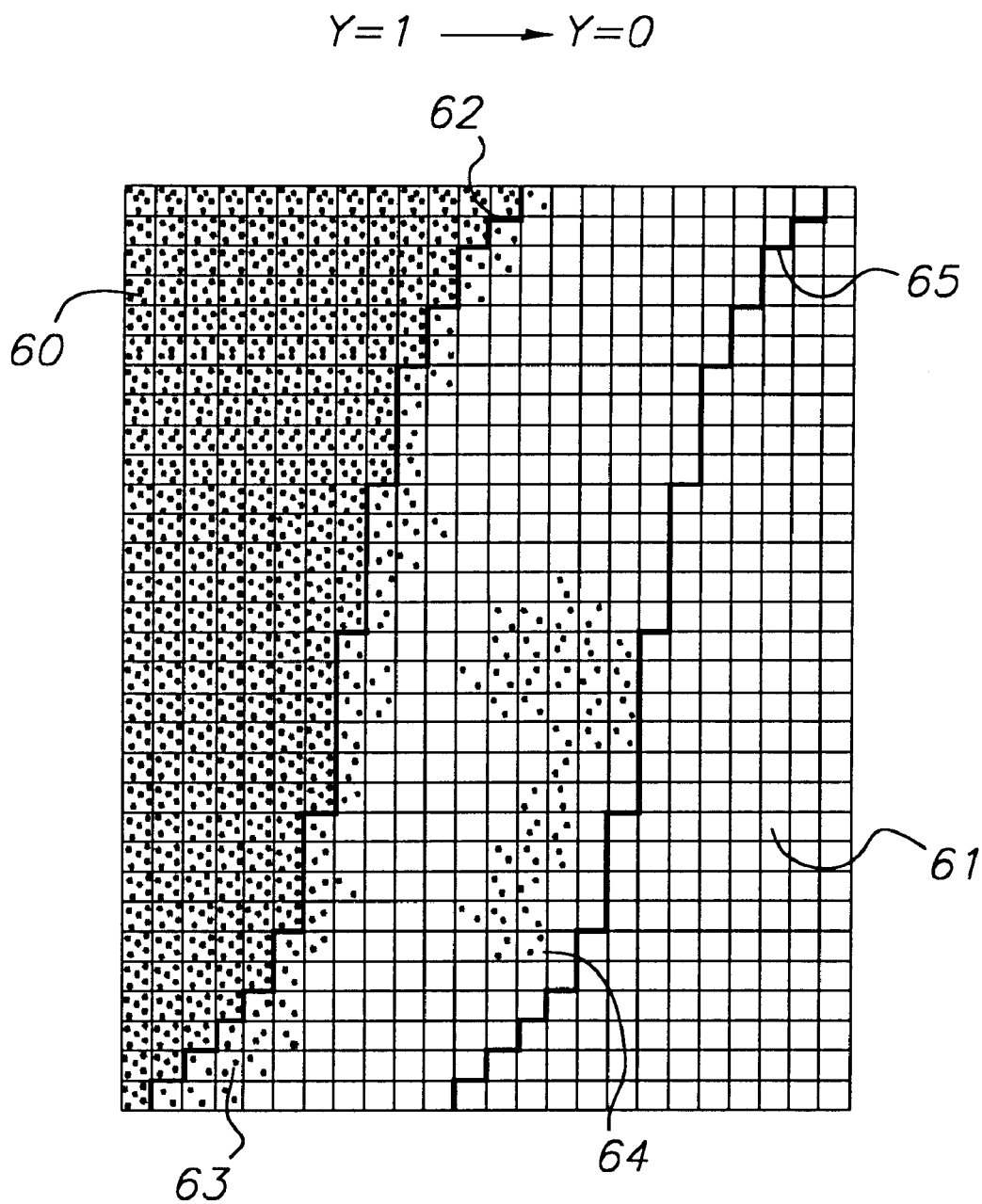
FIG. 6 illustrates an example image containing a key color region, mixed region, and foreground region.

To illustrate the benefits of the method of the present invention, consider the example shown in FIG. 6. The dark shaded region shows an image area that was classified as a key color region 60. The remainder of the image is therefore classified as the non-key color region 61. The boundary 62 between the key color region and the non-key color region is shown as a dark line. Several regions that were determined to be contaminated by the key color are shown as lightly shaded areas. A first contaminated area 63 is in the vicinity of the boundary 62 between the key color region and the non-key color region. A second contaminated area 64 is further away from the boundary. For this example, we will assume that the first contaminated area 63 is formed by the normal blurring of the edge between the subject and the key color backdrop, whereas the second contaminated area 64 is formed by secondary illumination of the subject by light that has reflected off of the backdrop. The values of the first control signal for these contaminated areas can be quite similar since it is generally a function of the color difference between the contaminated pixels and the key color. As a result, if the first image were combined with a second background digital image using a conventional method, the combined image formed in the second contaminated area 64 will contain a significant component of the second background digital image. This would make it appear that the subject was actually partially transparent which would be quite objectionable.

This deficiency is solved using the method of the present invention. In this example, the second control signal y is computed to have a value of 1.0 in the vicinity of the boundary 62 between the key color region and the non-key color region, and a smoothly decreasing value as the pixels are farther from the boundary. Beyond a mixed zone limit 65, the value of the second control signal will be 0.0.

The characteristic behavior of the present invention can be understood by examination of Eq. (4). For pixels in the first contaminated area 63, the value of the second control signal will be close to 1.0. It can therefore be seen that the resulting color value of the combined image R will be approximately given by:

$$R = F - k*C + k*S \qquad (5)$$

In this case, it can be seen that the key color C is replaced by the color value of the second background digital image, S. This is appropriate in the vicinity of the boundary because it is desirable for it to appear that the subject was blurred with the new background rather than the key color backdrop.

However, for pixels in the second contaminated area 64, the value of the second control signal will be close to 0.0. It can therefore be seen that the resulting color value of the combined image R will be approximately given by:

$$R = F - k*C + k*I \qquad (6)$$

In this case, it can be seen that the key color C is replaced by the illuminant color value I. This is an appropriate result for pixels that have secondary illumination artifacts since it will simply make it appear that the secondary illumination had been caused by a white light source rather than a light source having the color of the key color (e.g., green). This produces a much more normal appearance.

The method of this invention will also provide improved results if the "contaminated pixels" are actually not contaminated at all, but instead represent subject colors that are close to the key color. In this case, the inclusion of the second control signal reduces the incorrect replacement of foreground region pixels that have color values similar to the key color value, with background region pixels.

A computer product having a computer program therein can be used for combining a first digital image and a second background digital image, both images include pixels having color values, wherein the first digital image includes both a foreground region having foreground color values and a key color region characterized by a key color, as well as a mixed region where the pixel color values are a mixture of the foreground color value and the key color. The computer program product may comprise, for example, magnetic storage media such as a magnetic disk (floppy disk) or magnetic tape; optical storage media such as optical disks, optical tape and solid state storage devices such as random access memory (RAM); read only memory (ROM); or any other physical device or medium employed to store a computer program.

The invention has been described in detail with particular reference to certain preferred embodiments thereof, but it will be understood that variations and modifications can be effected within the spirit and scope of the invention.

PARTS LIST 10 image capture step
12 segmentation step
14 control signal creation step
16 image composition step
20 key color region
22 large key color region
24 small key color region
26 mixed region
28 key color region
30 first control signal generation step
32 segmentation step
34 second control signal generation step
36 image combination step
40 key color volume characterized by a multi-dimensional look-up table
42 key color volume defined by ranges of hue angles and chroma values
50 key color region
51 non-key color region
52 boundary between key color region and the non-key color region
53 mixed region
54 foreground region
60 key color region
61 non-key color region
62 boundary between key color region and the non-key color region
63 first contaminated area
64 second contaminated area
65 mixed zone limit

What is claimed is:

1. A method for combining a first digital image and a second background digital image, both images including pixels having color values, wherein the first digital image includes both a foreground region having foreground color values and a key color region characterized by a key color, as well as a mixed region where the pixel color values are a mixture of the foreground color value and the key color, comprising the steps of:

a) determining a first control signal that indicates the relative proportions of the foreground color value and the key color for pixels in the first digital image;

b) segmenting the first digital image into a key color region and a non-key color region in which the non-key color region includes pixels in the first digital image that are not in the key color region;

c) determining a second control signal that indicates a spatial distance between the pixels in the first digital image and a boundary between the key color region and the non-key color region; and d) combining the first digital image and the second background digital image in response to the first and second control signals, the key color, and an illuminant color value.

2. The method of claim 1 wherein step a) further includes the step of computing a color difference signal between the color values of the pixels in the first digital image and the key color.

3. The method of claim 2 wherein the color difference signal includes a hue difference signal.

4. The method of claim 2 wherein the color difference signal includes a chroma difference signal.

5. The method of claim 1 wherein the key color is characterized by a distribution of key color values.

6. The method of claim 1 wherein the key color is defined by a key color volume in a color space.

7. The method of claim 6 wherein the pixels in the first digital image that are in the key color region are identified by determining the pixels that have color values that fall within the key color volume.

8. The method of claim 1 wherein step c) further includes:

i) forming a mask image where the pixels in the key color region have a first value, and the pixels in the non-key color region have a second value;

ii) convolving the mask image with a convolution filter to determine a convolved mask image having convolved mask pixel values; and iii) computing the second control signal as a function of the convolved mask pixel values.

9. The method of claim 8 wherein the second control signal is given by $$y = \left(\frac{G - c_1}{c_2}\right)^{\alpha_g}$$

where y is the second control signal, G is the convolved mask pixel value, and $c_1$, $c_2$ and $\alpha_g$ are constants.

10. The method of claim 1 wherein the illuminant color value is a neutral color value.

11. The method of claim 1 wherein the illuminant color value corresponds to the color value of a particular illuminant having desired spectral characteristics.

12. The method of claim 1 wherein the illuminant color value has the same luminance level as the key color.

13. The method of claim 1 wherein the first digital image and the second background digital images are combined by performing a weighted summation of the color values of the first digital image, the color values of the second background digital image, the illuminant color value, and the key color value, where weighting values are determined from the first and second control signals.

14. The method of claim 13 wherein the first and second digital images are combined using the following equation:

$$R = F - k*C + k*y*S + k*(1-y)*I$$

where k is the first control signal, y is the second control signal, F is the color value of a pixel in the first digital image, S is the color value for a corresponding pixel in the second background digital image, C is the key color, I is the illuminant color value, and R is the color value of the combined image.

15. A computer product having a computer program therein for combining a first digital image and a second background digital image, both images include pixels having color values, wherein the first digital image includes both a foreground region having foreground color values and a key color region characterized by a key color, as well as a mixed region where the pixel color values are a mixture of the foreground color value and the key color, comprising the steps of:

a) determining a first control signal that indicates the relative proportions of the foreground color value and the key color for pixels in the first digital image;

b) segmenting the first digital image into a key color region and a non-key color region in which the non-key color region includes pixels in the first digital image that are not in the key color region;

c) determining a second control signal that indicates a spatial distance between the pixels in the first digital image and a boundary between the key color region and the non-key color region; and d) combining the first digital image and the second background digital image responsive to the first and second control signals, the key color, and an illuminant color value.

\* \* \* \* \*